Sept. 2, 1958  F. J. KLANCNIK, JR  2,849,770
WIRE TYPE HOSE CLAMP
Filed April 17, 1957

INVENTOR
FRANK J. KLANCNIK, JR.
by: Fred Gerlach
ATTY.

United States Patent Office 2,849,770
Patented Sept. 2, 1958

2,849,770

WIRE TYPE HOSE CLAMP

Frank J. Klancnik, Jr., Chicago, Ill.

Application April 17, 1957, Serial No. 653,431

4 Claims. (Cl. 24—27)

The present invention relates generally to clamps. More particularly, the invention relates to that type of clamp which is designed primarily to clamp one end of a hose to one end of a conduit, is formed of a length of wire, has its central portion bent to form a loop for encircling one end of a hose, has its end portions arranged in side-by-side relation and extending in opposite directions, and is provided with means whereby its end portions may be forced away from one another in order to contract the loop and thus cause it to clamp one end of the hose around the one end of the conduit.

One object of the invention is to provide a hose clamp of the aforementioned type and which is an improvement upon, and has certain inherent advantages over, previously designed clamps and is characterized by low cost of manufacture, high efficiency, and ease or facility of application and removal.

Another object of the invention is to provide a hose clamp of the type and character under consideration and in which the extremities of the side-by-side oppositely extending end portions of the length of wire are provided with outwardly extending eyes, and the means for forcing away from one another the end portions of the loop-forming length of wire is formed separately from the latter and is in the form of a V-shaped piece of wire which consists of a bent intermediate part and a pair of straight angularly disposed side parts, lies in the same plane as the loop, is arranged so that its bent intermediate part is disposed midway between, and normally outwards of, the end portions of the loop-forming length of wire and the side parts thereof extend towards said end portions, has the outer ends of its side parts extending into, and connected to, the outwardly extending eyes on the extremities of the end portions of the loop-forming length of wire, is adapted when the bent intermediate part is pressed inwards towards the loop to have the side parts thereof spread apart and thereby force the end portions of the loop-forming length of wire away from one another for loop contracting purposes, and has such physical characteristics or properties that the bent intermediate part after being pressed towards the loop tends to remain in the position into which it is pressed until such time as it is intentionally pressed outwards for loop expanding purposes in connection with removal of the clamp to the hose to which it is applied.

A further object of the invention is to provide a hose clamp of the character last mentioned and in which the eyes on the extremities of the side-by-side oppositely extending end portions of the loop-forming length of wire extend at right angles to, and radially outwards from, the loop, and the outer ends of the side parts of the separately formed V-shaped piece of wire are permanently connected to the eyes by welds.

A still further object of the invention is to provide a hose clamp which is generally of new and improved construction and effectively fulfills its intended purpose.

Other objects of the invention and the various characteristics of the present hose clamp will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 3:
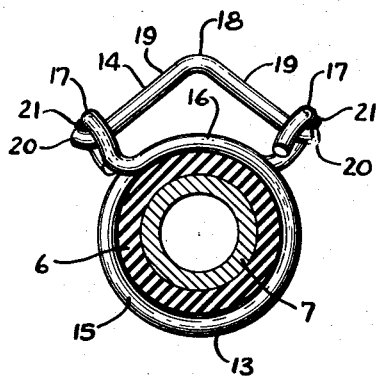
Figure 4:
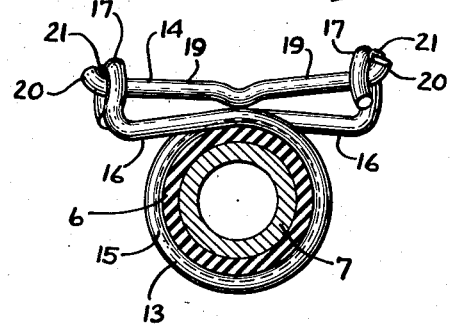

Figure 3 is a view showing the hose and conduit in section and the clamp in side elevation and before it has been manipulated into its hose clamping position by pressing or forcing inwards towards the loop the bent intermediate part of the V-shaped piece of wire; and Figure 4 is a view that is similar to Figure 3 except that it shows the clamp after the bent intermediate part of the V-shaped piece of wire has been pressed inwards for loop contracting purposes.

The hose clamp which is shown in the drawing constitutes the preferred form or embodiment of the invention. It is of two-piece construction and serves as a medium or instrumentality for clamping one end of a hose 6 around one end of a conduit 7. It is contemplated that the hose 6 will be formed of rubber, rubberized fabric or any other flexible, compressible and resilient material. The conduit 7 is illustrated in the drawing as being a pipe nipple although it is to be understood that it may be any other tubular element through which a fluid (liquid or gas) may flow. The clamp when in its operative position (see Figure 4) functions so to clamp or contract one end of the hose around the one end of the conduit as to form a fluid tight joint or seal. The two hereinafter recited pieces or parts are formed of wire. The wire of which such parts are formed is preferably, but not necessarily, circular in cross section. It is formed of any suitable metal or metal alloy and is of the type that is inherently resilient but will when sharply bent retain the bend.

Figure 1:
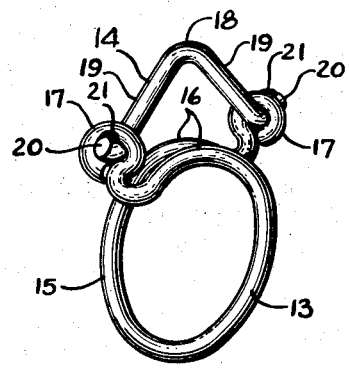
Figure 1 is a perspective of a hose clamp embodying the invention.
Figure 2:
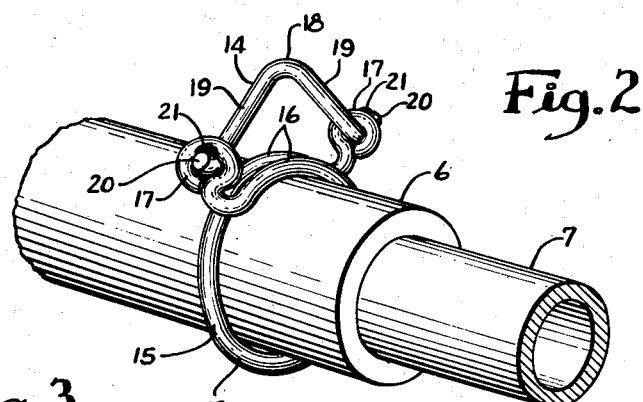
Figure 2 is a perspective showing the hose clamp after it has been applied to a hose around a conduit but before inward pressing of the bent intermediate part of the separately formed V-shaped piece of wire for loop contracting purposes.

As its components, the clamp comprises a wire length 13 and a V-shaped wire piece 14. The central portion of the length 13 of wire is bent to form a loop 15 for encircling the hose 6 as shown in Figures 2, 3 and 4. It is contemplated that normally the internal diameter of the loop 15 will be slightly greater than the external diameter of the hose. The end portions of the wire length 13 are designated in the drawing by the reference numeral 16 and are arranged in side-by-side relation and so that they extend in opposite directions. The extremities of the end portions 16 are bent to form substantially circular eyes 17. The latter extend at right angles to, and radially outwards from, the loop 15 and due to the length of the end portions 16 are spaced an appreciable distance apart. The separately formed V-shaped wire piece 14 is disposed outwards of, and lies in the same plane as, the loop 15 and consists of a bent intermediate part 18 and a pair of straight angularly disposed side parts 19. The bent or intermediate part 18 of the wire piece 14 is disposed midway between, but normally outwards of, the eyes 17 at the extremities of the end portions 16 of the wire length 13 and extends throughout an arc of approximately 90° as shown in Figures 1, 2 and 3. The side parts 19 of the V-shaped wire piece 14 extends towards the end portions 16 and have the outer ends thereof bent outwards so as to form substantially coaxial connecting parts 20. The latter fit within, and are connected by welds 21 to, the eyes 17 and serve with the eyes as means for connecting the outer ends of the side parts 19 to the end portions 16 of the wire length 13. In general, the separately formed V-shaped wire piece 14 forms or constitutes means whereby in connection with inward forcing or pressing of the bent intermediate part 18, the end portions 16 of the wire length 13 are forced away from one another and result in contraction of the loop 15 for hose clamping purposes.

In connection with use of the clamp, it is contemplated that the loop 15 will be slid into encircling relation with the hose 6 before the conduit 7 is inserted into the hose. After the conduit 7 is inserted into the hose, the clamp is manipulated so that the loop 15 surrounds the end of the hose that extends around the inserted end of the conduit. After the clamp is properly manipulated or positioned, the bent intermediate part 18 of the separately formed wire piece 14 is forced or pressed inwards towards the loop 15 by striking it with a hammer or other suitable tool. In connection with inward pressing of the bent part 18, the straight angularly disposed side parts 19 flatten or straighten out as shown in Figure 4. In connection with the straightening out action of the end parts 19, the end portions 16 of the wire length 13 are forced away from one another and result in contraction of the loop 15. It is contemplated that the bent part 18 will be pressed or forced inwards to such an extent that the loop 15 will be contracted sufficiently to cause the hose to be firmly clamped around the conduit 7. Because of the character or physical properties of the wire of which the V-shaped piece 14 is formed, the bent intermediate part 18 tends after being pressed inwards towards the loop 15 to remain in the position into which it is pressed. Because of this, the loop 15 will remain in its contracted position wherein it serves, as previously pointed out, firmly to clamp the hose 6 around the conduit 7. When it is desired to release the clamp, the bent intermediate part 18 is forced or pressed outwards into its original or normal position. This results in the side parts 19 swinging or moving inwards. Such movement on the part of the side parts 19 of the V-shaped wire piece 14 operates to draw the side-by-side oppositely extending end portions 16 of the wire length 13 towards one another thereby resulting in expansion of the loop 15.

The herein described hose clamp is essentially simple in design and may be produced at an extremely low cost. Because of the particular construction or design, the clamp may be applied and removed with facility. By reason of the fact that the separately formed V-shaped wire piece 14 of the clamp includes the bent intermediate part 18, the loop 15 may, within certain limitations, be contracted to any desired extent and will stay or remain in the particular position into which it is contracted.

The invention is not to be understood as restricted to the details set forth since these may be modified within the scope of the appended claims without departing from the spirit and scope of the invention.

This application for Letters Patent is a division of application Serial No. 448,242, filed by me on August 6, 1954 and entitled "Wire Type Hose Clamps."

Having thus described the invention what I claim as new and desire to secure by Letters Patent is:

1. As a new article of manufacture, a clamp adapted to extend around a hose and clamp the latter on a conduit and comprising a preformed length of flexible material having the central portion thereof bent to form a circular, hose encircling loop the internal diameter of which is originally greater than the external diameter of the hose, and having its end portions arranged in side-by-side relation and extending in opposite directions, and a preformed form, separately formed, single, V-shaped piece of wire consisting solely of a bent intermediate part and a pair of straight angularly disposed side parts, positioned so that the intermediate part is originally disposed outwards of the loop and the side parts extend in the direction of the end portions of the length of flexible material, having the outer ends of its side parts connected fixedly to the extremities of said end portions respectively, adapted when the bent intermediate part is pressed towards the loop after mounting of the loop around the hose to have the side parts thereof spread apart and cause said end portions to move away from one another and contract the loop into firmly clamped relation with the hose, also adapted when said intermediate part is pressed away from the loop to have its side parts move towards one another and cause said end portions to move towards one another and expand the loop so that it may be removed from the hose, and formed of wire of the type that is resilient but will when sharply bent retain the bend to the end that said bent intermediate part will tend to remain in either position into which it is pressed.

2. As a new article of manufacture, a clamp adapted to extend around a hose and clamp the latter on a conduit and comprising a preformed length of wire having the central portion thereof bent to form a circular, hose encircling loop the internal diameter of which is originally greater than the external diameter of the hose, and having its end portions arranged in side-by-side relation, extending in opposite directions and provided at their extremities with outwardly extending eyes, and a preformed, separately formed, single, V-shaped piece of wire consisting solely of a bent intermediate part and a pair of straight angularly disposed side parts, positioned so that the intermediate part is originally disposed outwards of the loop and the side parts extend in the direction of the end portions of the length of wire, having the outer ends of its side parts extending into said eyes respectively, adapted when the intermediate part is pressed towards the loop after mounting of the loop around the hose to have the side parts thereof spread apart and cause said end portions to move away from one another and contract the loop into firmly clamped relation with the hose, and formed of wire of the type that is resilient but will when sharply bent retain the bend to the end that said bent intermediate part will tend to remain in place when pressed towards the loop for loop contracting purposes.

3. As a new article of manufacture, a clamp adapted to extend around a hose and clamp the latter on a conduit and comprising a preformed length of wire having the central portion thereof bent to form a circular, hose encircling loop the internal diameter of which is originally greater than the external diameter of the hose, and having its end portions arranged in side-by-side relation, extending in opposite directions and provided at their extremities with outwardly extending eyes, and a preformed, separately formed, single, V-shaped piece of wire consisting solely of a bent intermediate part and a pair of straight angularly disposed side parts, positioned so that the intermediate part is originally disposed outwards of the loop and the side parts extend in the direction of the end portions of the length of wire, having the outer ends of its side parts extending into, and connected to, said eyes, adapted when the intermediate part is pressed towards the loop after mounting of the loop around the hose to have the side parts thereof spread apart and cause said end portions to move away from one another and contract the loop into firmly clamped relation with the hose, also adapted when said intermediate part is pressed away from the loop to have its side parts move towards one another and cause said end portions to move towards one another and effect expansion of the loop so that it may be removed from the hose, and formed of wire of the type that is resilient but will when sharply bent retain the bend to the end that said bent intermediate part will tend to remain in either position into which it is pressed.

4. A clamp according to claim 3 and in which the eyes extend at right angles to, and radially outwards from, the loop and the outer ends of the side parts of the V-shaped piece of wire are connected to the eyes by welds.

References Cited in the file of this patent

UNITED STATES PATENTS

| | | |
|---|---|---|
| 1,419,408 | Polhemus | June 13, 1922 |

FOREIGN PATENTS

| | | |
|---|---|---|
| 674,557 | Germany | Apr. 17, 1939 |